US005561901A

United States Patent [19]

Stahley et al.

[11] Patent Number: 5,561,901

[45] Date of Patent: Oct. 8, 1996

[54] ASSEMBLY PROCESS INCLUDING SEVERING PART OF INTEGRAL COLLAPSIBLE PUMP CHAMBER

[75] Inventors: Robert E. Stahley, Middletown; Robert J. Peterson, Loveland, both of Ohio

[73] Assignee: The Procter & Gamble Company, Cincinnati, Ohio

[21] Appl. No.: 319,219

[22] Filed: Oct. 6, 1994

[51] Int. Cl.$^{6}$ .......... B23P 15/00

[52] U.S. Cl. .......... 29/888.02; 239/333

[58] Field of Search .......... 29/888.02; 239/333, 239/463, 468, 471

[56] References Cited

U.S. PATENT DOCUMENTS

| | | | |
|---|---|---|---|
| 2,774,518 | 12/1956 | Greene | 222/209 |
| 2,824,672 | 2/1958 | Wersching | 222/207 |
| 3,124,275 | 3/1964 | Lake | 222/182 |
| 3,193,154 | 7/1965 | Bross | 222/207 |
| 3,471,092 | 10/1969 | Hickey | 239/579 |
| 3,752,366 | 8/1973 | Lawrence et al. | 222/207 |
| 3,910,444 | 10/1975 | Foster | 215/295 |
| 3,973,700 | 8/1976 | Schmidt et al. | 222/153 |
| 4,082,223 | 4/1978 | Nozawa | 239/333 |
| 4,101,057 | 7/1978 | LoMaglio | 222/207 |
| 4,120,429 | 10/1978 | Vignot | 222/207 |
| 4,147,282 | 4/1979 | Levy | 222/387 |
| 4,204,614 | 5/1980 | Reeve | 222/153 |
| 4,220,264 | 9/1980 | Gamadia | 222/207 |
| 4,232,828 | 11/1980 | Shelly, Jr. | 239/329 |
| 4,260,079 | 4/1981 | Cary et al. | 222/209 |
| 4,273,290 | 6/1981 | Quinn | 239/493 |
| 4,310,104 | 1/1982 | Takatsuki | 222/131 |
| 4,313,568 | 2/1982 | Shay | 239/333 |
| 4,318,498 | 3/1982 | Magers et al. | 222/153 |
| 4,336,895 | 6/1982 | Aleff | 222/207 |
| 4,358,057 | 11/1982 | Burke | 239/333 |
| 4,589,574 | 5/1986 | Foster | 222/153 |
| 4,624,413 | 11/1986 | Corsette | 239/333 |
| 4,640,444 | 2/1987 | Bundschuh | 222/321 |
| 4,651,904 | 3/1987 | Schuckmann | 222/383 |
| 4,655,690 | 4/1987 | Boedecker et al. | 417/53 |
| 4,732,549 | 3/1988 | von Schuckmann | 417/472 |
| 4,781,311 | 11/1988 | Dunning et al. | 222/153 |
| 4,846,372 | 7/1989 | von Schukmann | 222/136 |

(List continued on next page.)

FOREIGN PATENT DOCUMENTS

| | | | |
|---|---|---|---|
| 0520315 | 12/1992 | European Pat. Off. | B05B 11/00 |
| 1442883 | 5/1966 | France . | |
| 2305365 | 3/1975 | France | B65D 47/26 |
| 2380077 | 9/1978 | France . | |
| 2524348 | 10/1983 | France . | |
| 2621557A | 10/1987 | France | B65D 1/32 |
| 2630712A | 4/1988 | France | B65D 47/34 |
| 3909633 | 10/1990 | Germany . | |
| WO92/22495 | 6/1991 | WIPO | B67D 5/42 |
| WO93/14983 | 1/1993 | WIPO | B65D 23/10 |
| WO94/13547 | 12/1993 | WIPO | B65D 41/18 |

OTHER PUBLICATIONS

Reifenberger et al. Ser. No. 08/203,321, Pump Device With Collapsible Pump Chamber Having Integral Shipping Seal, Feb. 28, 1994.

*Primary Examiner*—Irene Cuda
*Attorney, Agent, or Firm*—Daniel F. Nesbitt

[57] ABSTRACT

A collapsible pump chamber includes several functional elements of a pump device. For example, the collapsible pump chamber may be a bellows which includes a functional element of an outlet valve, a functional element of a biasing feature, and a functional element of a spin chamber. Consequently, a functional element of all of the downstream functions are incorporated into the bellows. This can significantly reduce costs; due to reduced tooling, and assembly, for example. Since it can be desirable to separate these functions (e.g., to achieve more consistent spray quality), a process is described for severing functions from the multiple function collapsible pump chamber during the assembly of the pump device.

19 Claims, 12 Drawing Sheets

U.S. PATENT DOCUMENTS 4,858,478 8/1989 Kush et al. .......................... 73/864.35
4,858,788 8/1989 Meckenstock .......................... 222/207
4,863,070 9/1989 Andris .......................... 222/207
4,898,307 2/1990 Tiramani .......................... 222/207
4,915,601 4/1990 von Schuckmann .......................... 417/472
4,979,646 12/1990 Andris .......................... 222/136
5,014,881 5/1991 Andris .......................... 222/207
5,018,894 5/1991 Goncalves .......................... 401/202
5,031,802 7/1991 Joulia .......................... 222/205
5,042,694 8/1991 Birmelin .......................... 222/145
5,096,094 3/1992 Guilbert .......................... 222/153
5,114,052 5/1992 Tiramani et al. .......................... 222/207
5,158,233 10/1992 Foster et al. .......................... 239/333
5,190,190 3/1993 Fudalla .......................... 222/105
5,195,878 3/1993 Sahiavo et al. .......................... 417/393
5,197,866 3/1993 Kim .......................... 417/472
5,205,441 4/1993 Andris .......................... 222/207
5,234,166 8/1993 Foster .......................... 239/333
5,303,850 4/1994 Connan .......................... 222/153
5,303,867 4/1994 Peterson .......................... 239/333
5,333,761 8/1994 Davis et al. .......................... 222/212

ASSEMBLY PROCESS INCLUDING SEVERING PART OF INTEGRAL COLLAPSIBLE PUMP CHAMBER

BACKGROUND OF THE INVENTION

1. Field of the Invention

The present invention relates to the process for assembling manually operated liquid dispensing pump devices for use with consumer product containers; and more particularly, to such processes for assembling such devices having a collapsible pump chambers (e.g., a bellows pump chamber) wherein multiple functions are integrally molded into the bellows.

2. Description of the Prior Art

Manually operated dispensing devices for pumping liquid from a supply container are widely known in the art. These liquid dispensers traditionally utilize a piston and cylinder pump chamber. A helical metal spring is generally utilized to provide the force necessary to return the piston to its initial position. Additional parts are generally related to an inlet valve, an outlet valve and a vent valve. Furthermore, in cases where a liquid spray discharge is desired, additional parts are often related to a swirl chamber. One disadvantage of such piston and cylinder dispensing devices is the great amount of sliding friction developed between the piston and the cylinder due to the tight telescopic fit required to maintain a fluid tight seal. Binding, may also occur between the piston and cylinder. Another disadvantage includes the relatively large number of parts such sprayers typically utilize which generally increases the cost of such pumps.

Consequently, attempts to utilize a manually compressible flexible pump chamber in place of the piston and cylinder have been made. For example, bellows have been utilized to replace the function of the piston, cylinder and return spring. Still other liquid dispensing devices have utilized a diaphragm or bladder as the manually compressible pump chamber. The use of such manually compressible pump chambers is substantially free of the sliding friction and the potential binding losses associated with the piston and cylinder. Some of these pump devices have integrally molded duckbill, flapper and/or annular sealing valves with the pump chamber. One disadvantage in the use of such valves is that they do not readily enable the further integral molding of additional functions. Thus, additional parts are generally required; thereby increasing the cost of the pump device. Furthermore, the integral molding of reliable valves can be difficult.

SUMMARY OF THE INVENTION

In accordance with one aspect of the present invention a process for assembling a manually operated dispensing device for pumping a liquid from a supply container and spraying the liquid through a discharge orifice is provided. The process includes the step of integrally molding a collapsible pump chamber (preferably, a bellows) with a functional element of another function at one end of the collapsible pump chamber. The functional element may include, e.g., a functional element of the outlet valve and/or a functional element of the outlet valve biasing spring. Also included is the step of molding a nozzle with a retaining means for cooperating with a retaining means from the collapsible pump chamber to attach the two parts together. Another step involves pressing the collapsible pump chamber and the nozzle together to attach the two parts together via the retaining means. A further step is the severing of the functional element from the collapsible pump chamber.

BRIEF DESCRIPTION OF THE DRAWINGS

While the specification concludes with claims particularly pointing out and distinctively claiming the present invention, it is believed the present invention will be better understood from the following description in conjunction with the accompanying drawings in which:

DETAILED DESCRIPTION OF THE INVENTION

Figure 1:
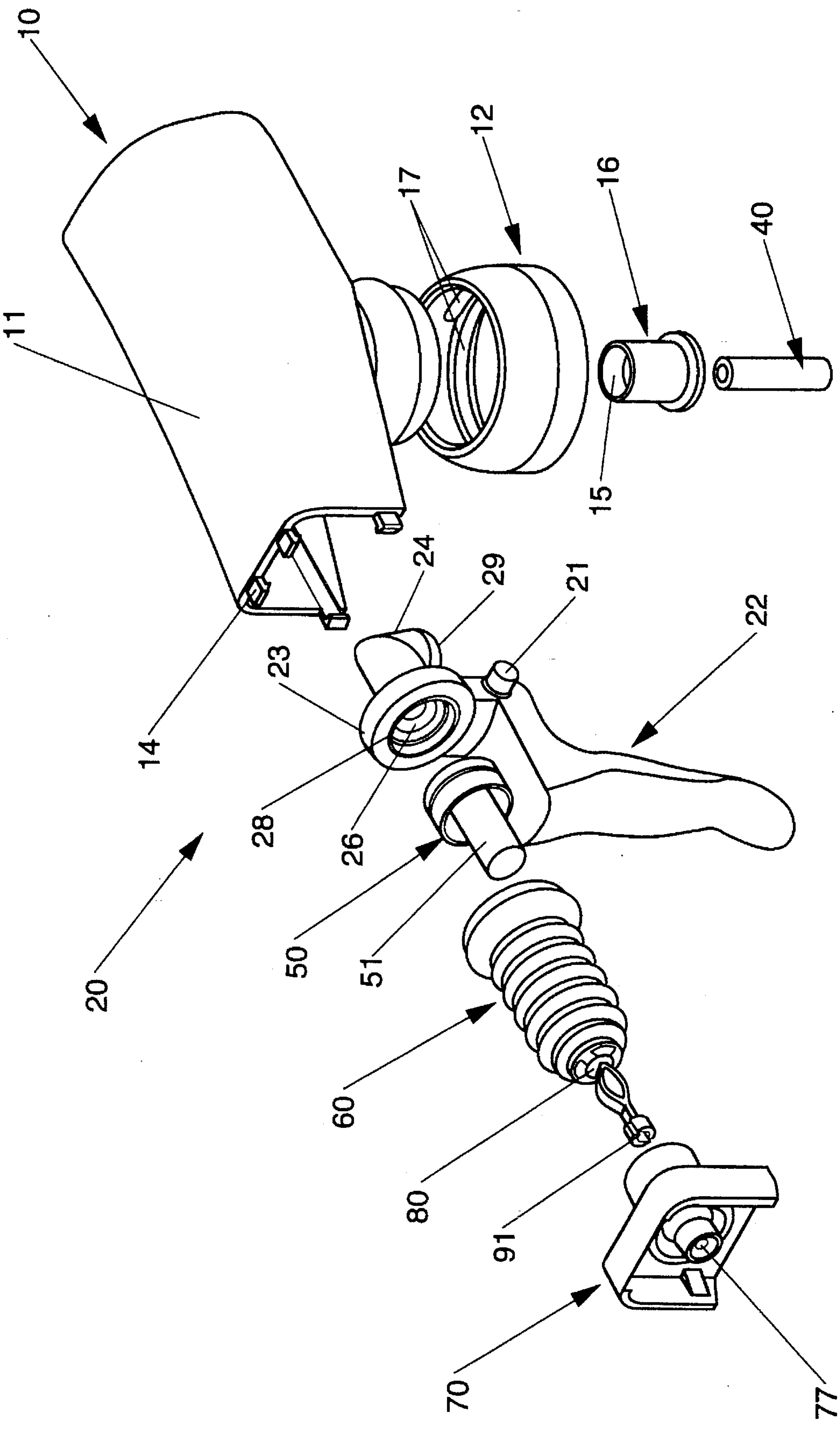
FIG. 1 is an exploded perspective view of a particularly preferred liquid dispensing pump device of the present invention.
Figure 2:
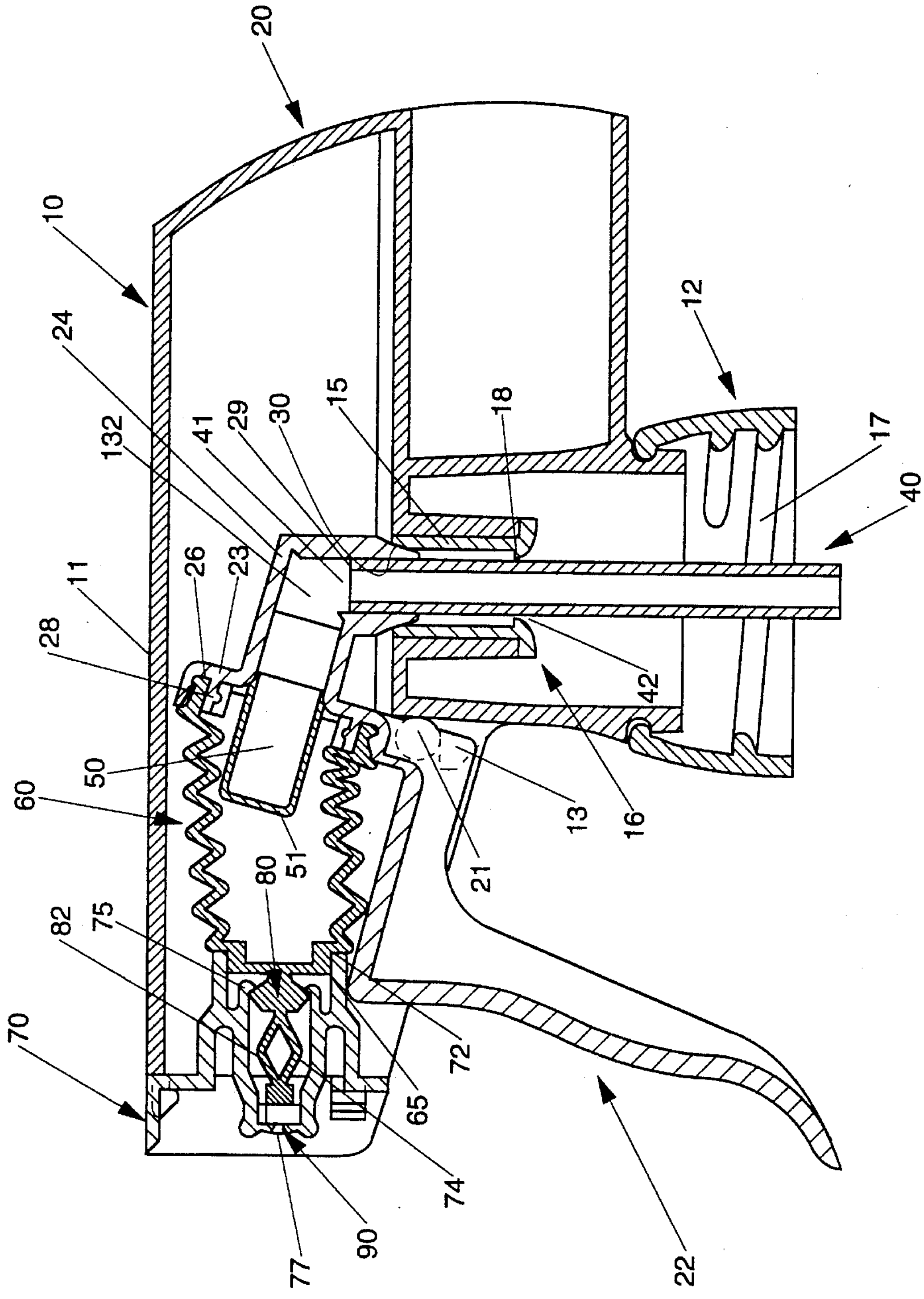
FIG. 2 is a cross-sectional view, taken along the center line, of the assembled liquid dispensing pump device of FIG. 1.

In FIG. 1 there is seen, in exploded perspective view, a particularly preferred liquid dispensing pump device of the present invention, indicated generally as 20. A cross-sectional view of this particularly preferred, fully assembled, liquid dispensing pump device 20 is seen in FIG. 2; and is seen in operation in FIG. 3. The illustrated liquid dispensing pump device 20 basically includes a trigger 22; a vent tube 16; a dip tube 40; a housing 10 including a nozzle 70, a shroud 11,a closure 12; a collapsible pump chamber 60 and an inlet valve member 50. Integral with the inlet valve member is a dunnage means 51.

As used herein, the phrase "collapsible pump chamber" is defined as a pump chamber delineated—at least partially—by a flexible wall which moves in response to a manual compressive force in such a way that the volume within the pump chamber is reduced without sliding friction between any components delineating the pump chamber. Such compressible pump chambers may include balloon-like diaphragms and bladders made from elastomeric materials such as thermoplastic elastomers, elastomeric thermosets (including rubber), or the like. For example (not seen), the collapsible pump chamber may include a helical metal or plastic spring surrounding (or covered by) an elastic material; creating an enclosed pump chamber. However, the preferred collapsible pump chamber 60 is a bellows; i.e., a generally cylindrical, hollow structure with accordion-type walls. Bellows are preferred, for example, because they can be made resilient to act like a spring; eliminating the need for a spring. Furthermore, the collapsible pump chamber includes one or more integral elements which enable the collapsible pump chamber to perform multiple functions. As used herein, the term "integral" is defined as molded, or otherwise formed, as a single unitary part.

Figure 11:
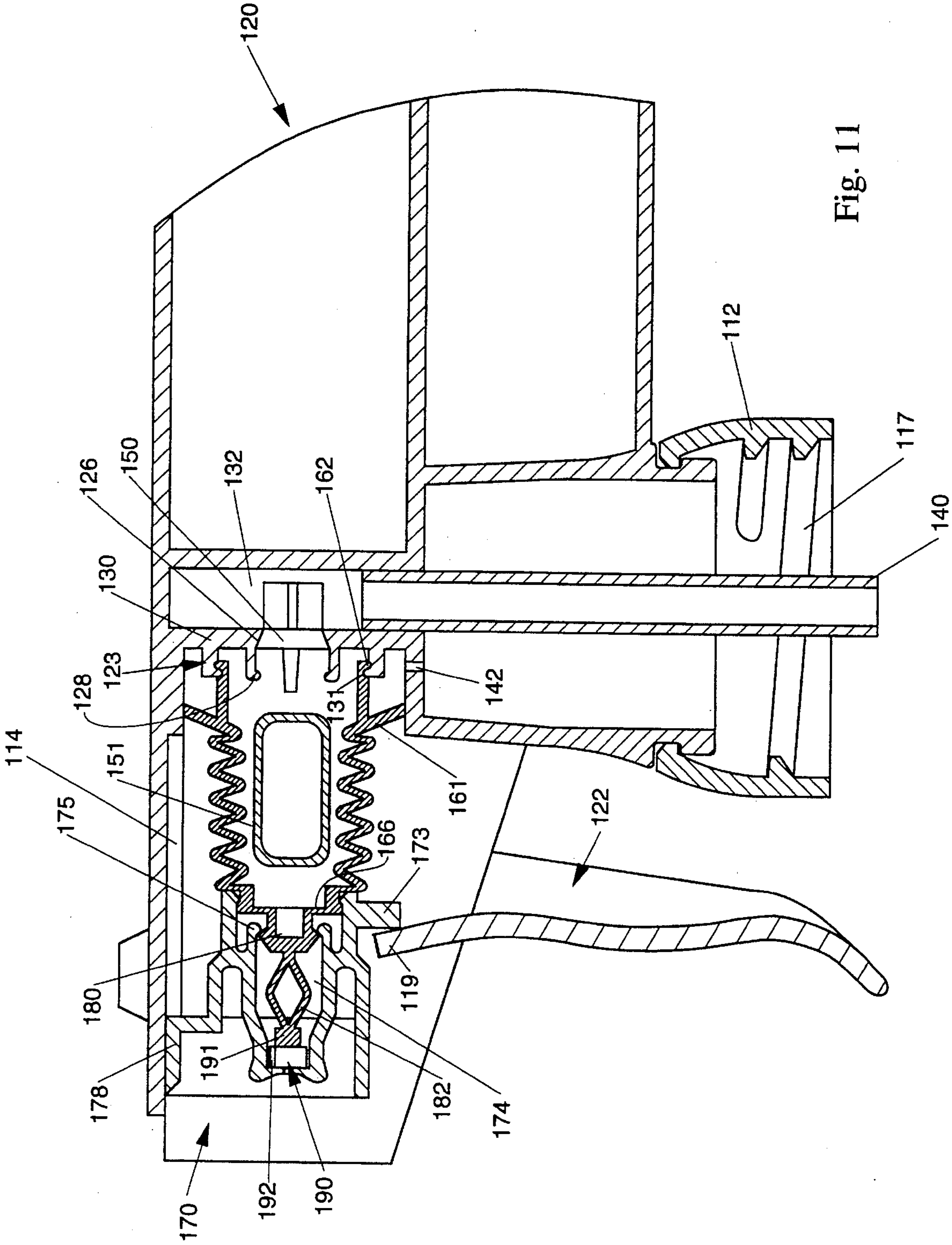
FIG. 11 is a cross-sectional view, similar to FIG. 3, of the liquid dispensing pump device of FIG. 8 in operation.

The housing 10 is used for sealingly mounting the liquid dispensing device 20 to a liquid supply container (not seen) via the closure. The illustrated closure 12 includes screw threads 17 for attaching the housing 10 to the container (not seen). Alternatively, the closure 12 may utilize a bayonet-type attachment structure (not seen) such as that described, for example, in the following Patents and patent applications hereby incorporated herein by reference: U.S. Pat. No. 4,781,311 issued to Dunning et al. on Nov. 1, 1988; and U.S. Pat. No. 3,910,444 issued to Foster on Oct. 7, 1975; PCT Application U.S.93/00899 published Aug. 5, 1993 (see, e.g., FIGS. 11 and 12) and PCT Application GB93/02561 published Jun. 23, 1994. Also, the closure 12 may be integral with the shroud 11. The illustrated shroud 11 includes an integral "C"-shaped hinge 13 for attaching the trigger 22 to the housing 10; and a plurality of tabs 14 for attaching the nozzle 70 to the housing 10. Additionally, the illustrated housing 10 includes a vent tube 16 having a vent valve seat 15. Alternatively, the vent robe 16 and its vent valve seat 15 and may be integral (not seen) with either the shroud 11 or the closure 12. The housing 10 may be molded from one or more thermoplastic materials, such as polypropylene, polyethylene or the like.

Passing through the housing 10 is a liquid passage which is delineated by several parts, including the diptube 40, the tubular pipe 24, the collapsible pump chamber 60, and the nozzle 70. The liquid passage provides fluid communication from the distal end of the dip tube 40 within the supply container (not seen) in a downstream direction to the discharge orifice 77 of the nozzle 70. As used herein, the term "downstream" is defined as in the direction from the supply container (not seen) to the nozzle 70; and "upstream" is defined as in the direction from the nozzle 70 to the supply container (not seen). Similarly, as used herein, the phrase "inlet end" means the upstream end and the phrase "outlet end" means the downstream end.

A portion of the liquid passage is provided by a tubular pipe 24 which is integral with the trigger 22. The trigger 22 is utilized to manually compress the collapsible pump chamber 60, as described hereinafter. The trigger 22 is attached to the housing 10 by the hinge 13 through an integral cylinder pivot 21; allowing the trigger 22 to rotate freely relative to the housing 10. The trigger 22 further comprises an angled tube pipe 24, a pump coupler 23, and inlet valve seat 26, and a vent valve member 29, all preferably integral with the trigger 22. The trigger 22 may be molded from a thermoplastic material such as polypropylene, polyethylene, or the like.

The exterior surface of the upstream end of the tubular pipe 24 is a conically shaped vent valve member 29. Additionally, a conically shaped valve seat 15 is provided by vent tube 16. Thus, the vent valve member 29 and the vent valve seat 15 form a vent valve 15 and 29. The vent valve 15 and 29 is biased closed due to the resiliency of the bellows 60 to seal the vent channel 42 between the dip tube 40 and the vent tube 16. When the trigger 22 is manually rotated about the pivot 21, the vent valve 15 and 29 opens; thereby providing fluid communication via the vent channel between the interior of the container (not seen) and the atmosphere; permitting the internal pressure within the container (not seen) to equalize with the atmosphere as liquid is dispensed from the container (not seen) through the pump device 20.

Additionally, the dip tube 40 which is friction fit within the tubular pipe 24 provides another portion of the liquid passage. The dip tube 40 is preferably held by the tubular pipe 24 at an angle with respect to the pump coupler 23. This angle is preferably equal to one half the maximum rotational angle through which the trigger 22 is rotated when liquid dispensing pump device 20 is attached to the liquid supply container (not seen). The dip tube 40 is preferably formed of thermoplastic material such as polypropylene, polyethylene, or the like.

A liquid inlet valve member 50 is located within the liquid passage. The inlet valve member 50 is connected to an outer annular wall 25 via three equally spaced flexible ribs 33. The outer annular wall 25 (and in turn the inlet valve member 50) is attached to the pump coupler 23 via retaining rib 28 and cooperating retaining recess 27. The inlet valve member 50 of this embodiment includes a conical surface at its distal end. Thus, this conical surface of the inlet valve member 50 cooperates with the inlet valve seat 26 to seal the liquid passage under positive downstream pressure conditions. Alternatively, the liquid inlet valve 26 and 50 may be of any type generally known in the art including a duckbill, ball, poppet, or the like.

The inlet valve member 50 of this embodiment also functions as dunnage means 51 for reducing the compressed volume within the pump chamber. The inlet valve member 50 extends into the interior of the bellows and terminates at an end wall; thereby forming an open-ended, hollow, generally cylindrical structure which operates as the dunnage means 51. Such a hollow structure is preferred. For example, hollow structures require significantly less material in relation to the volume they can occupy within the collapsible pump chamber 60; and hollow structures are susceptible to high cycle times during molding since cooling time is reduced. It is also preferred that the dunnage means 51 not be integral with the housing 10, e.g., because such hollow structures are difficult to mold attached to the housing 10 (unless, e.g., the valve seat is extended into the interior of the bellows). Alternative dunnage means could be attached to the outlet valve member 75, the bellows 60, or even be free floating (as seen, e.g., in FIGS. 8 through 11). Dunnage means 51 significantly reduces the interior volume of the collapsible pump chamber 60 which fluid may occupy; providing a particularly large reduction during the collapsed state of the collapsible pump chamber 60. A more detailed explanation of the function of the dunnage means 51 is discussed hereinafter.

Another portion of the liquid passage is defined by the collapsible pump chamber 60. The collapsible pump chamber 60 has a structure which is flexible such that it can be manually compressed; thereby reducing the volume within the collapsible pump chamber 60. Although a spring (not seen) may be utilized to help return the collapsible pump chamber 60 to its original shape, the collapsible pump chamber 60 is preferably sufficiently resilient that it returns to its initial shape when the manual compression force is released.

The illustrated collapsible pump chamber is a bellows. A preferred bellows should have several qualities. For example, the bellows should make the pump device easy to actuate. Generally this means having a spring force from about three pounds to about five pounds. The bellows should also have good resiliency with minimal hysterisis and creep. Furthermore, the bellows preferably has good stiffness in the radial direction (hoop strength) to ensure the bellows is not radially deformed under normal operating conditions. Lastly, the bellows preferably has a good volumetric efficiency; i.e., change in internal volume divided by the total expanded internal volume.

Some geometric features which can be utilized to endow the bellows with the appropriate qualities include the diameter of the bellows. The larger the diameter the lower the spring force and the lower the radial stiffness. Although lower spring force is generally desirable, lower radial stiffness can be a problem; e.g., the bellows might blow out in a precompression trigger sprayers. Increasing the wall thickness of the pleats will increase radial stiffness but it increases the spring force and results in decreased volumetric efficiency of the bellows. Reducing the pleat angle generally decreases the spring force but decreases the volumetric efficiency. The pleat angle is the aggregate of two angles; the angle above a line normal to the axis and passing through the origin of a pleat and the angle below that line. Preferably, the pleat angle above the normal line is about 30° and the pleat angle below the normal line is about 45° (making removal of the bellows from the core pin easier). Increasing the number of pleats will lower the spring force and lower the volumetric efficiency.

Although not wishing to be bound, it is believed that the major components of the spring force are the wall thickness and the upper and lower pleat angles while the major component of resiliency is material selection.

Material selection can also help endow the bellows with the appropriate qualities. In general the material preferably has a Young's modulus below 10,000 psi. For lotion pumps the a Young's modulus below 3,000 psi is preferred. The material should enable retention of mechanical properties, be dimensionally stable and be resistant to stress cracking. These properties should be present over time in air and in the presence of the liquid product. Thus, for trigger sprayers which generally spray acidic or alkaline cleaning products comprised of significant quantities of water the material should not be pH sensitive and should not undergo hydrolysis. Exemplary such materials include polyolefins such as polypropylene, low density polyethylene, very low density polyethylene, ethylene vinyl acetate. Other materials which may be utilized include thermosets (e.g., rubber), and thermoplastic elastomers. Most preferred for trigger sprayers is a high molecular weight ethylene vinyl acetate with a vinyl acetate content between about 10 and 20 percent. For other pumps (e.g., lotion pumps) pH and hydrolysis may not be an issue. Instead a low spring force with a high resiliency may be more important. In such cases a low modulus ethylene vinyl acetate or a very low density polyethylene are preferred.

An exemplary bellows made of ethylene vinyl acetate or very low density polyethylene might have a 0.6 in inner large diameter and a 0.4 inch inner small diameter and a wall thickness of between about 0.02 inch and 0.03 inch. The aggregate pleat angle would be about 75°; with the upper pleat angle 30° and the lower pleat angle 45°.

The bellows, which provides the manually compressible pump chamber 60 of this embodiment, is attached to the housing 10 via the pump coupler 23 of the trigger 22. The upstream, or inlet, end of the bellows 60 is attached to the pump coupler 23 via cooperating annular ribs 31 and 62. The cooperating ribs 31 and 62 also help provide a liquid tight seal under positive pump pressure. Thus, the inlet end of the bellows 60 is in liquid communication with liquid supply container (not shown). The inlet end of the bellows 60 is wide open to permit reliable, cost effective thermoplastic molding.

Similarly, the outlet end of the bellows 60 is attached to the nozzle 70 via cooperating annular ribs 72 and 65 to provide a liquid tight seal under positive pump pressure. The nozzle 70 is attached to the shroud 11 through a plurality of tabs 14 that are positively engaged with an equal number of slots 78 in the nozzle 70. The nozzle 70 is in liquid communication with the outlet end of the bellows 60 and forms a portion of the liquid passage; including the discharge orifice 77. Furthermore, the nozzle 70 includes the outlet valve seat 75. The nozzle 70 may further include a hinged door (not seen) shipping seal which can be moved to a closed position sealing the discharge orifice 77—or to an open position permitting the discharge of liquid through the discharge orifice 77. An exemplary nozzle and hinge door structures are disclosed in Foster et al. U.S. Pat. No. 5,158,233 issued Oct. 27, 1992; hereby incorporated herein by reference in its entirety. The nozzle 70 may be molded from a thermoplastic material such as polypropylene, polyethylene, or the like.

Figure 4:
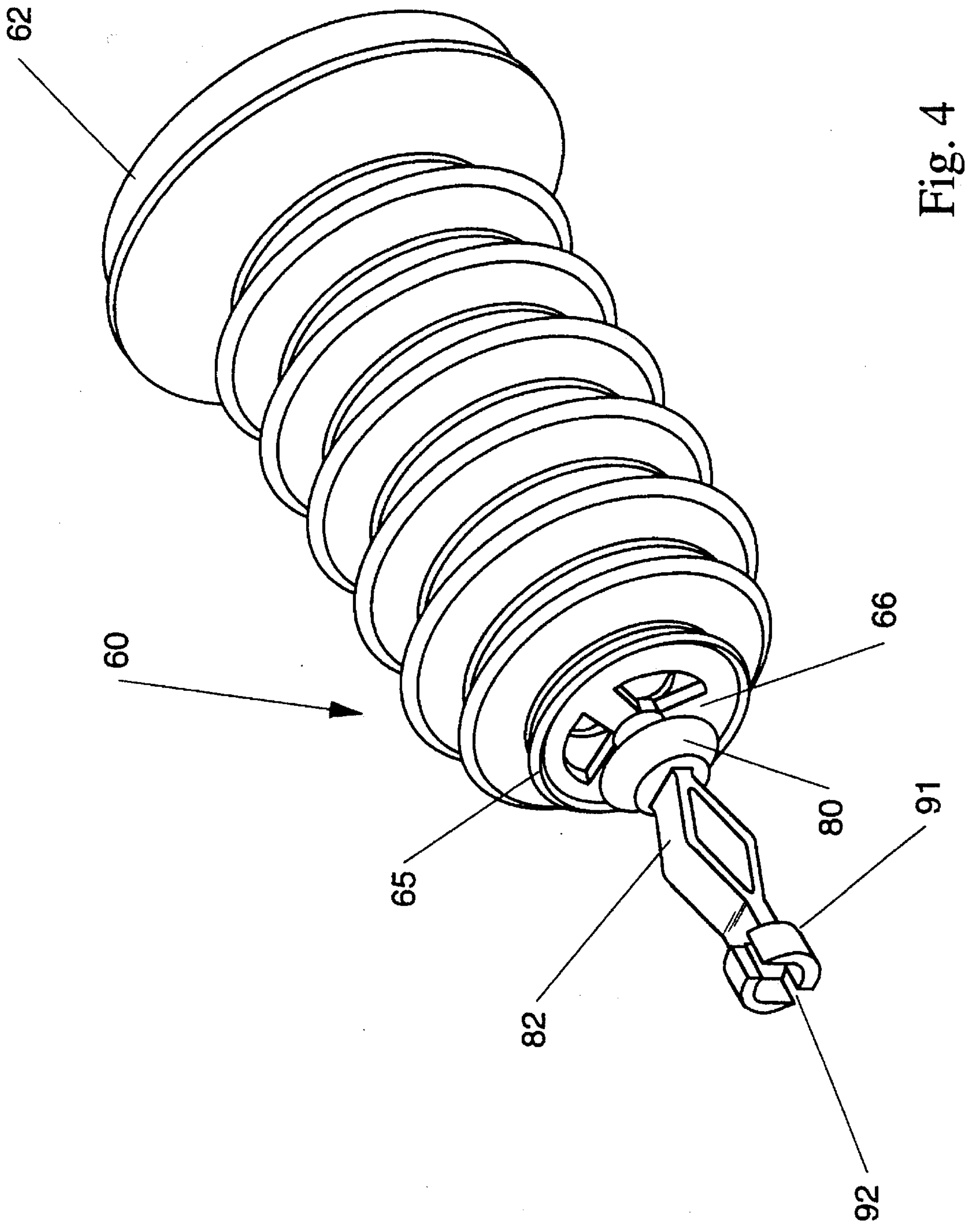
FIG. 4 is an enlarged perspective view of the multiple function collapsible pump chamber of the liquid dispensing pump device of FIG. 1.
Figure 5:
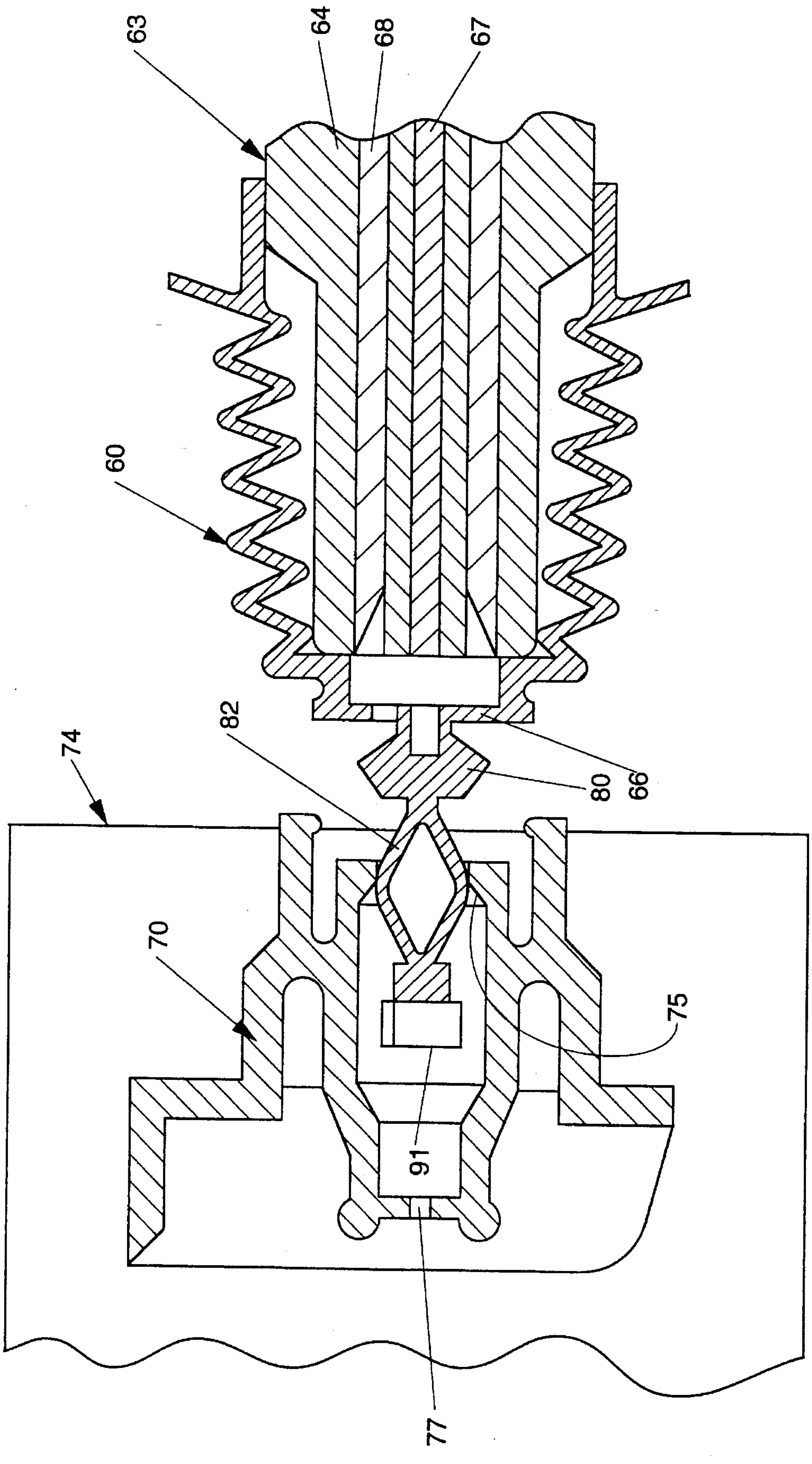
FIG. 5 is a cross-sectional view of the FIG. 1 bellows and nozzle—each being held by assembly tools—immediately prior to being assembled together.

Referring to FIGS. 4 and 5, the bellows 60 is preferably molded including an integral functional element of the swirl chamber 90. The swirl chamber 90 comprises the downstream terminal portion of the liquid passage. The illustrated swirl chamber 90 is defined by two parts; the nozzle 70, including an end wall 76 and the-discharge orifice 77, and the spinner 91 which is integral with the downstream end of the bellows 60. The illustrated bellows 60 is directly in line with and adjacent to the nozzle 70. The spinner 91 has a generally hollow cylindrical shape with two arcuate channels 92 in the side wall which direct the liquid traveling therethrough tangentially toward the inner surface of the spinner's 91 side wall, and tangential to the axis of the discharge orifice 77. This imparts radial momentum to the liquid just prior to exiting said discharge orifice 77; aiding in spray formation. Alternatively, the swirl channels 92 may be molded integral with the nozzle 70 as seen, for example, in FIGS. 12, 14 and 15; discussed hereinafter. Examples of alternative springs and swirl chambers are disclosed in the following patents, hereby incorporated herein by reference: U.S. Pat. No. 4,273,290 issued to Quinn on Jun. 16, 1981; and U.S. Pat. No. 5,234,166 issued to Foster et al. on Aug. 10, 1993.

The bellows 60 is also preferably molded including an integral functional element of the outlet valve. The outlet valve includes the outlet valve member 80 and the outlet valve seat 75. As illustrated, the outlet valve member 80 is the portion integral with the bellows 60 through two or more integrally formed flexible legs 66 that radially extend like spokes between the valve member 80 and the body of the bellows 60. The outlet valve seat 75 includes a conically shaped surface which cooperates with a conical surface on the outlet valve member 80. The outlet valve 75 and 80 is located within the liquid passage and operates to seal the passage under negative upstream pressure conditions. Alternative liquid outlet valves (not seen) may be of any type generally known in the art, including a duckbill, ball, poppet, or the like.

Preferably the outlet valve 75 and 80 or the inlet valve 26 and 50 is closed at rest such that the pump will not lose its prime between operations. More preferably, it is the outlet valve 75 and 80 which is closed, since this provides many benefits. For example, since the outlet valve 75 and 80 is closer to the discharge orifice 77, less product is likely to drip from the nozzle 70 when the outlet valve is closed. Even more preferably, the outlet valve 75 and 80 is biased closed. Most preferably, the outlet valve 75 and 80 is significantly biased closed such that precompression is provided. Precompression is provided at the consumer product flow rates typical of such pump sprayers when the outlet valve 75 and 80 remains closed until a pressure of about 50 psi is reached inside the bellows 60. Biasing helps provide good spray formation and helps give the spray stream a quick start and stop. As discussed hereinafter, the outlet valve 75 and 80 may be biased in such a way that the biasing force drops as the outlet valve 75 and 80 opens. As illustrated the biasing force can be provided by the legs 66, a spring 82, or both. It has been found that under some circumstances, at least, it is preferable to sever the flexible legs 66 during the assembly process as discussed hereinafter—so that the entire biasing force is provided by the spring 82.

The illustrated spring 82 is diamond shaped and can be formed utilizing a side action mold. In addition, such springs 82 provide a force which acts directly along the axis of the spring 82. The undeformed legs of the spring 82 are at small angle Beta (β) with respect to the axis of liquid passage. In this state, the product of the force of biasing spring 82 and the β force vector in line with the passage is near maximum. As the positive liquid pressure within the bellows 60 acts upon surface the outlet valve member 80, the legs of the spring 82 flexibly rotate about the corners and angle Beta, (β), increases, thus decreasing the β force vector multiplier. Consequently, when this spring force component is great, compared to the spring force components due to the resiliency of the legs 66 and the resiliency of the spring 82 leg material, the outlet valve 75 and 80 may be biased in such a way that the biasing force of the spring 82 drops as the valve opens. Alternative springs (not seen) which may be utilized to bias the outlet valve 75 and 80 include helical springs and wavy plate springs. In addition, some or all of the biasing force may be provided by the legs 66 connecting the bellows 60 to the outlet valve member 80. Thus, the illustrated bellows 60 of the present invention includes an integral functional component of all of the internal downstream functions (i.e., the outlet valve—including the biasing element, and the swirl chamber) of this liquid dispensing pump device 20.

As indicated above, it has been found that under some circumstances, at least, it is preferable to sever the flexible legs 66 during the assembly process so that the entire biasing force is provided by the spring 82. Variations in the molded parts (and/or how well the parts are fit together) including the distance from the outlet valve seat 75 to the point where the flexible legs 66 join the main body of the bellows 60, can result in variation of the biasing force due to the flexible legs 66. In turn, this biasing force variability results in variation of the precompression force—and thus, sprayer 20 performance. Consequently, utilizing only this spring 82 as the biasing force can reduce the variability of the biasing force from sprayer to sprayer. However, integrally molding the bellows 60, outlet valve member 80, biasing spring 82 and spinner 91 offers reduced costs associated with molding and handling separate parts during the manufacturing process. Therefore, these functions are molded as a single integral part and then the functions are severed during the assembly process.

Figure 7:
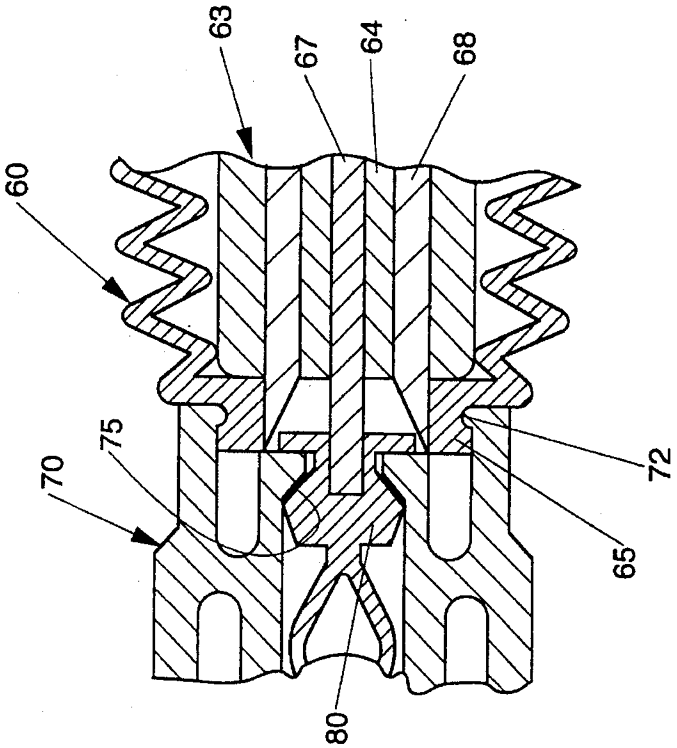
FIG. 7 is an enlarged fragmentary cross-sectional view similar to FIG. 6 but taken as the flexible ribs are being severed.

The process of severing the flexible legs 66 during assembly of the trigger sprayer 20 is described with reference to FIGS. 5, 6 and 7. Referring to FIG. 5, a nozzle assembly tool 74 with a recess matching the configuration of the nozzle 70 can be utilized to hold the nozzle 70. Similarly, the bellows 60 is held via friction fit on the illustrated bellows assembly tool 63. The bellows assembly tool 63 includes a housing 64, a insertion pin 67, and a sharp annular wall 68.

Figure 6:
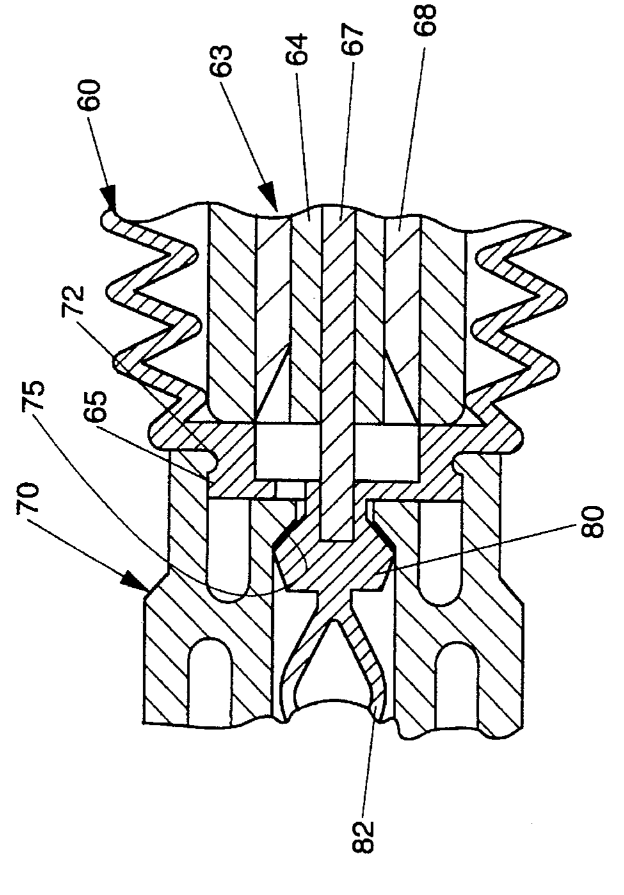
FIG. 6 is an enlarged fragmentary cross-sectional view similar to FIG. 5 but taken as the bellows and nozzle are being assembled.
Figure 8:
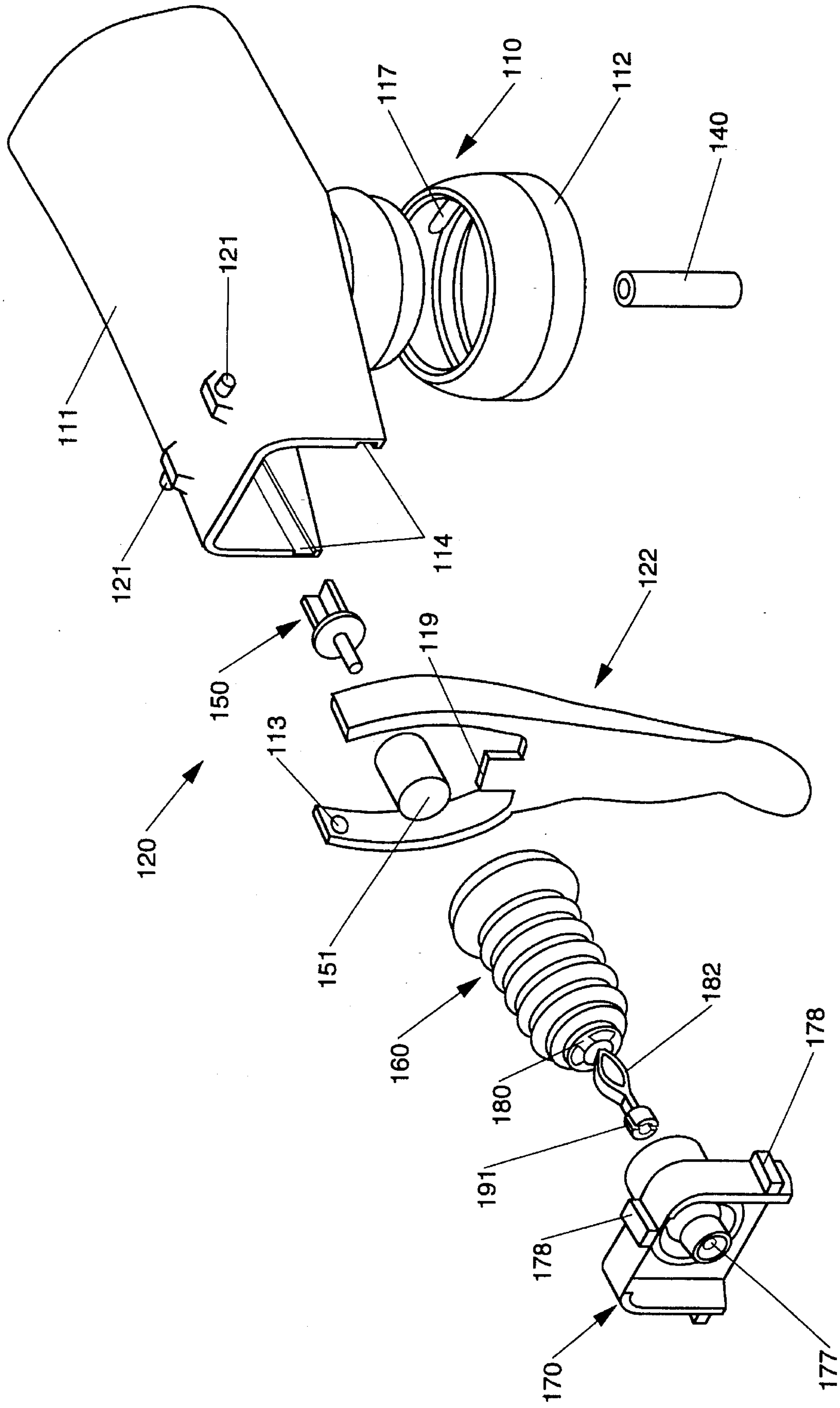
FIG. 8 is an exploded perspective view, similar to FIG. 1 of another particularly preferred liquid dispensing pump device of the present invention.
Figure 9:
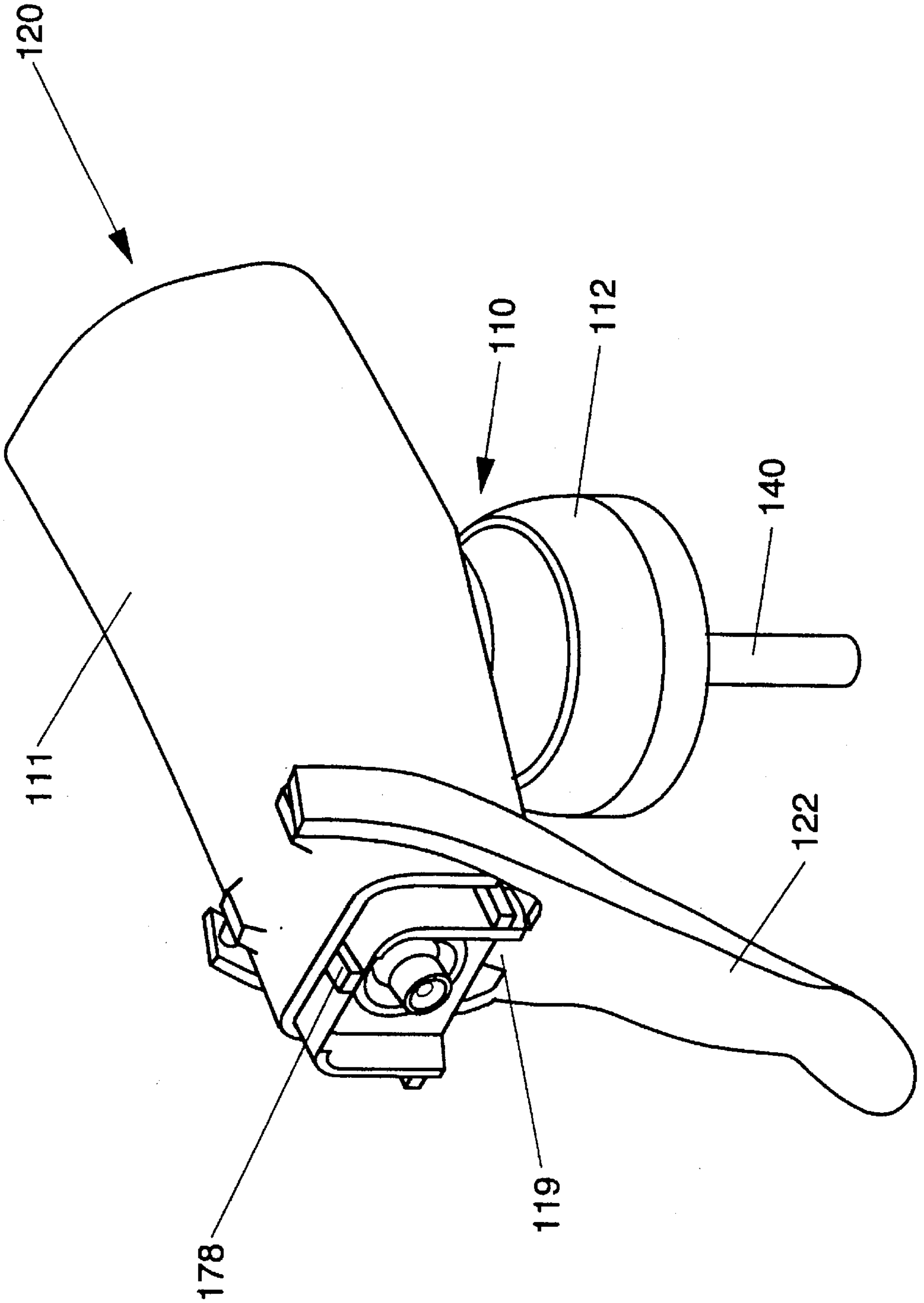
FIG. 9 is a perspective view of the fully assembled liquid dispensing pump device of FIG. 8.

Referring to FIG. 6, the entire bellows assembly tool 63 moves forward such that the shoulder of the outer distal end of the housing 64 pushes the bellows 60 onto the nozzle 70 such that the cooperating ribs 65 and 72 operate to attach the two together. The insertion pin 67 mates with the recess of the outlet valve member 80; thereby helping alignment. The insertion pin 67 continues to push the outer valve member 80 past the outer valve seat 75. This step stretches the ribs 66 somewhat. Referring to FIG. 7, the sharp annular wall 68 then moves forward until it presses against the distal end of the outlet valve seat 75 wall; thereby severing the ribs 66. The bellows assembly tool 63 is then removed; leaving the bellows 60 and nozzle 70 held by the nozzle assembly tool 74.

Of course, there are many alternative assembly tools and processes which would accomplish attaching the nozzle 70 and bellows 60 together and severing the flexible legs 66. For example, the insertion pin 67 and the sharp annular wall 68 could be a single integral part which would travel forward together to simultaneously push the outlet valve member 80 past the outlet valve seat 75 and sever the flexible legs 66. Similarly, the insertion pin 67 could move forward to engage the recess of the outlet valve member 80, then the sharp annular wall 68 could move forward to sever the ribs 66; and then the insertion pin 67 could continue forward to push the outlet valve member 80 into place. Additionally, a sharp edge may be provided on the distal end of the outlet valve seat 75 wall to provide a sharp cutting edge. Alternatively, the distal end of the outlet valve seat 75 wall could be located remote from the severing operation. One advantage of utilizing a sharp cutting edge on the assembly tool 63, the distal end of the outlet valve seat 75 wall, or both, is that the flexible legs 66 need not be particularly thin which can aid in molding the downstream functions integral with the bellows 60, since during molding the plastic may need to flow to these downstream functions (i.e., the outlet valve member 80, the biasing spring 82, and the spinner 90) through the channels which become flexible legs 66. Other alternatives processes are discussed hereinafter with reference to FIGS. 12, 13 and 14.

Figure 3:
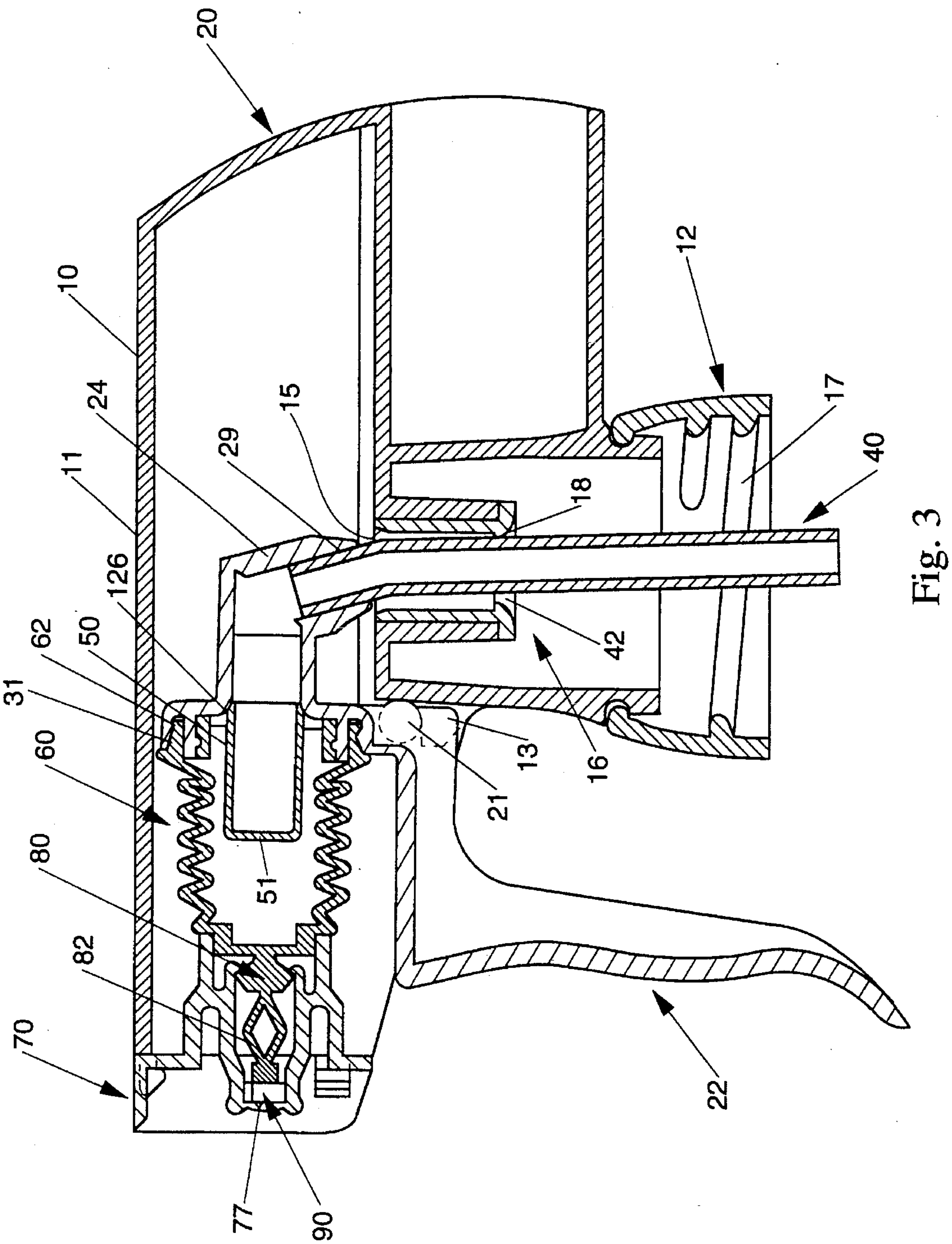
FIG. 3 is a cross-sectional view, similar to FIG. 2, of the liquid dispensing pump device in operation.

Referring to FIG. 3, operation of this liquid dispenser 20 involves manually depressing the trigger 22 which causes rotation of the trigger 22 about the pivot 21. Since the trigger 22 is attached to the bellows 60 through the pump coupler 23, this rotational motion of the trigger 22 results in rotational manual compression of the bellows 60 which moves the bellows from an expanded volume to a compressed volume. The resultant compression creates a positive pressure within the bellows 60. Since the inlet valve 26 and 50 is not biased closed, this positive pressure forces the inlet valve 26 and 50 to close if it is not already closed. Thus, during this period of positive pressure downstream of the inlet valve 26 and 50, the inlet valve 26 and 50 is closed which prevents liquid inside the bellows 60 from returning to the container (not seen).

Simultaneously, this positive pressure in the bellows 60, upstream of the outlet valve 75 and 80 acts upon the outlet valve member 80 and when the pressure within the pump chamber 60 reaches a level high enough to cause flexure of legs 66 (if attached) and spring 82, the outlet valve member 80 disengages from the outlet valve seat 75; opening the valve. Liquid in the bellows 60 then flows under pressure around the annular gap created between liquid outlet valve member 80 and outlet valve seat 75. The liquid continues to flow under pressure through spin chamber 90; i.e., spin channels 92 of the spinner 91 and out through the discharge orifice 77. As the liquid passes through the spin chamber 90 it gains a radial momentum prior to exiting the discharge orifice 77. The combination of radial and axial momentum causes the liquid to exit the discharge orifice 77 in a thin conical sheet which quickly breaks up into liquid particles. As an alternative to biasing the outlet valve 75 and 80 closed to generate pressure in the exiting liquid, the spin channels 92 (or the discharge orifice 77, for example) may operate as flow restrictions which result in increasing the pressure in the exiting liquid.

As seen in FIG. 3, dunnage means 51 reduces the compressed volume capable of being occupied by liquid in the collapsible pump chamber 60 as compared to the collapsed volume of the collapsible pump chamber 60 without dunnage means 51. Without the dunnage means 51 the collapsed volume of the collapsible pump chamber 60 includes the interior cylindrical volume defined by the collapsed length of the bellows 60 and the diameter of the collapsed interior folds of the bellows 60. With the dunnage means 50, this collapsed volume is reduced by the cylindrical volume of the dunnage means 51.

Such a reduced collapsed volume within the collapsible pump chamber 60 is advantageous. For example, the dunnage means 51 helps generate higher pressures within the pump chamber 60 when air is present; thereby being capable of overcoming a precompression biasing force on the outlet valve member 80. Additionally, the reduced volume results in fewer strokes to prime. Preferably, the number of strokes to initially prime the pump device 20 is at least one stroke less with the dunnage means 51 than without. Additionally, the total number of strokes to initially prime the pump device 20 with the dunnage means 51 is preferably less than about 6; and more preferably, less than about 4.

The reduced volume provided by the dunnage means 51 is particularly advantageous in collapsible pump chambers 60 whose major dimension is substantially horizontal; such as the illustrated trigger sprayer 20. In such horizontally oriented collapsible pump chambers 60, e.g., air can become trapped in the collapsible pump chamber 60 near the inlet valve 26 and 50. This can cause the trigger sprayer 22 to air lock and not prime; particularly if the sprayer 20 is pointed downwardly. Consequently, it is often preferable to associate the dunnage means 51 with the inlet valve 26 and 50. With the dunnage means 51 the air is forced from this position near the inlet valve 26 and 50 toward the outlet valve 75 and 80 so that it is moved out of the pump chamber 60 with much greater efficiency.

Rotation of the trigger 22 also results in the simultaneous opening of the vent valve 15 and 29. The vent valve member 29 at the end of the tubular pipe 24 is attached to the trigger 22 such that rotation of the trigger 22 moves the vent valve member 29 away from the vent valve seat 15. This provides a generally annular vent channel 42 between the vent tube 16 of the housing 10 and the dip tube 40. The vent channel 42 provides liquid communication between the interior of the container (not seen) and the atmosphere. Thus, air is able to flow from the atmosphere into the container (not seen) through this vent channel 42 to replace the volume of liquid being dispensed from the container (not seen). The vent tube 16 includes an annular rib 18 at its lower end which reduces the diameter of the vent channel 42 such that liquid will not readily splash out the vent channel 42 during operation. For example, the annular rib 18 preferably has an internal diameter which is about 0.005 inches larger than the outside diameter of the dip tube 40. Since the dip tube 40 is held by the rotating trigger 22, the diptube 40 flexes to follow the natural arc of the trigger 22. Alternatively, the vent valve opening may be large enough that no flexing of the dip tube 40 is required.

When the trigger 22 is released, the bellows 60 restores itself to its uncompressed state, through its resiliency. Alternatively, the bellows 60 may be aided in restoration by a spring (not seen) operating in conjunction with the bellows 60. Since the bellows 60 is attached to the trigger 22 through the coupler 23, restoration of the bellows 60 rotates the trigger 22 to its original position. As the bellows 60 returns to its original uncompressed state, a negative pressure, or vacuum, is created within the pump chamber 60. This negative pressure, upstream of the outlet valve 75 and 80, along with biasing spring 82 and the resiliency of the legs 66, causes the liquid outlet valve 75 and 80 to dose. Simultaneously this negative pressure, downstream of the inlet valve 26 and 50, opens liquid inlet valve 26 and 50; allowing liquid to enter the bellows 60 through the diptube 40. The tabs 28 limit the amount of disengagement of liquid inlet valve member 50 so that it is properly located for closing upon the next manual actuation of the liquid dispensing pump device 20.

Referring to FIGS. 8 through 11, a second alternative embodiment of a liquid dispensing device 120 of the present invention is illustrated. This embodiment utilizes linear, instead of rotary, motion of the bellows 160. The nozzle 170 is generally similar to nozzle 70. However, the nozzle 170 is slightly smaller in overall dimension and includes a lug 178 on each of its three sides and a depending wall 173 (seen in FIG. 10). Likewise, the bellows 160 is generally similar to the bellows 60. However, the bellows 160 includes a resilient annularly extending flange 161 near its inlet end which makes a cup seal against the inside of the housing 110.

Trigger 122 is substantially modified from that of FIG. 1. For example trigger 122 includes two upper elongated arms which each include a hinge 113. The hinges 113 cooperate with pivots 121 located on top of the shroud 111. Thus, the pivot point of this trigger 122 is located at the top of the housing 110. The trigger 122 also includes a push tab 119 which cooperates with the depending wall 173 of the nozzle 170 to enable linear compression of the bellows 160 upon manual actuation (i.e., rotation) of the trigger 122. Alternatively (not seen), the trigger 122 may be rigidly affixed to the nozzle 170 such that the trigger 122 is actuated through linear motion rather than rotational motion.

Likewise the housing 110 is substantially modified. For example the housing 110 includes channels 114 which cooperate with the three lugs 178 on the nozzle 170 to retain the nozzle 170 in place while allowing linear, reciprocating movement of the nozzle 170 relative to the housing 110. The housing 110 also includes the pump coupler 123 for the bellows 160 and an internal vertical wall 130 which provides an enclosed annular volume between it and the resilient flange 161 of the bellows 160. A vent hole 142 in the housing 110 provides fluid communication between this enclosed annular volume and the interior of the supply container (not seen). Similar to the inlet valve 26 and 50 of the previous embodiment, a poppet valve member 150 cooperates with a conically shaped inlet valve seat 126. In an alternative arrangement (not seen) the housing 110 can be modified to enclose a ball check valve member between the housing 110 and the diptube 140 in place of the illustrated inlet valve 126 and 150.

Dunnage means 151 of this embodiment is a hollow, free floating, substantially cylindrical structure. One advantage of such a dunnage means 151 is that it may tend to move toward any air pocket in the collapsible pump chamber 160; thereby forcing the air out of the collapsible pump chamber 160. The edges of the dunnage means 15 1 are rounded (e.g., like a capsule) to enable the dunnage means 151 to slide past the folds of the bellows 160 as the bellows 160 is collapsed; thereby avoiding binding the bellows 160 and interfering with the collapse of the bellows 160. One preferred way to form such a dunnage means 151 is to blow mold or injection mold the hollow cylindrical shape and pinch off the open end(s) to form the dunnage means 151.

As with the previous embodiment, the assembly process includes the step of severing the resilient legs 166 from the collapsible pump chamber 160. Thus, the combination spinner 190, spring 182 and outlet valve member 180 becomes a separate part and the spring 182 provides the entire biasing force for the outlet valve member 180. Consequently, the advantages of molding these parts as a single integral part which reduces molding and assembly costs are achieved along with the advantages of having these parts as separate structures (e.g., reduced biasing force variability).

Figure 12:
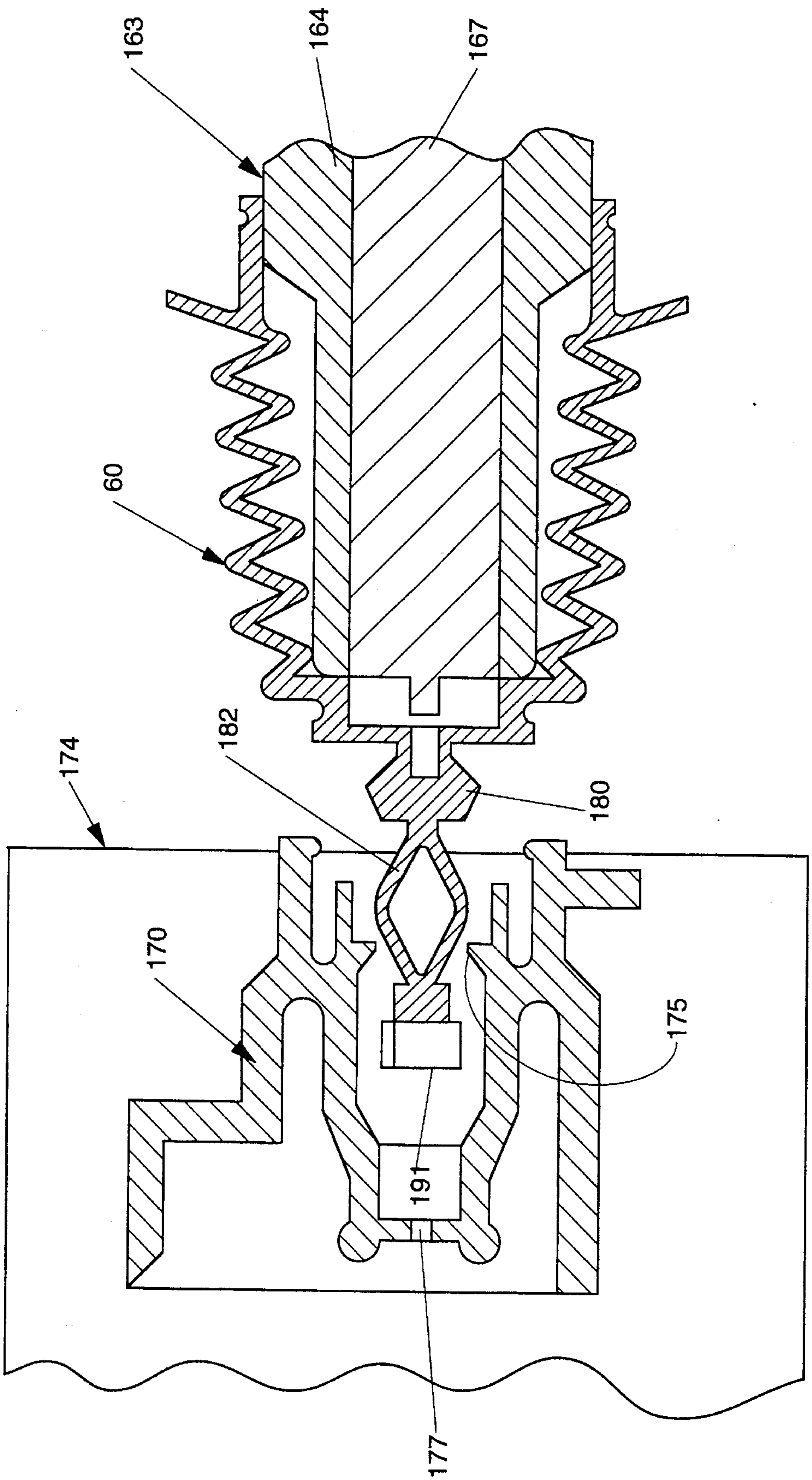
FIG. 12 is a cross-sectional view of the FIG. 8 bellows and nozzle—each being held by assembly tools—immediately prior to being assembled together.
Figure 14:
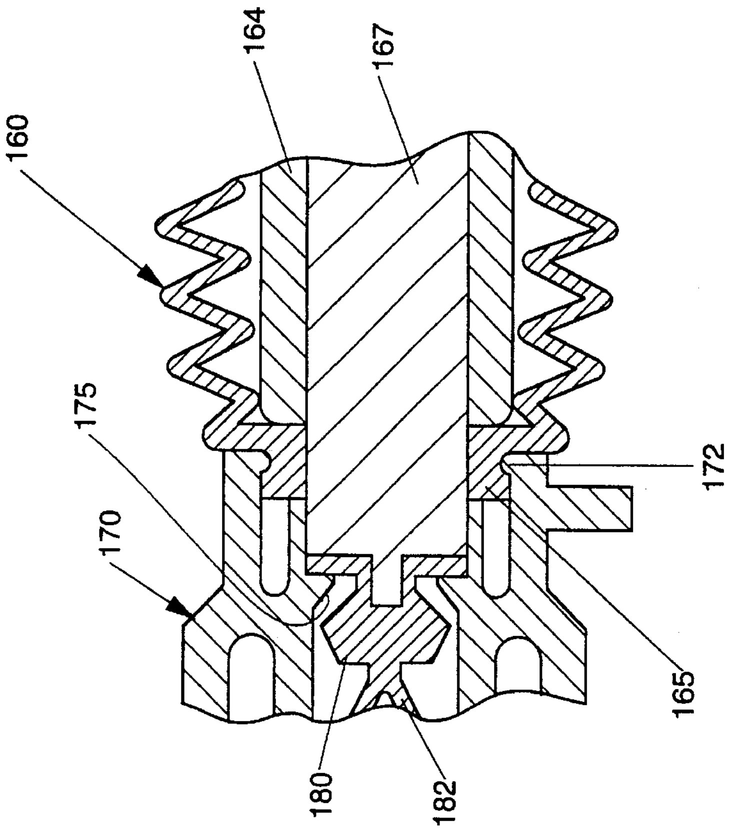
FIG. 14 is an enlarged fragmentary cross-sectional view similar to FIG. 13 but taken as the flexible ribs are being severed.
Figure 13:
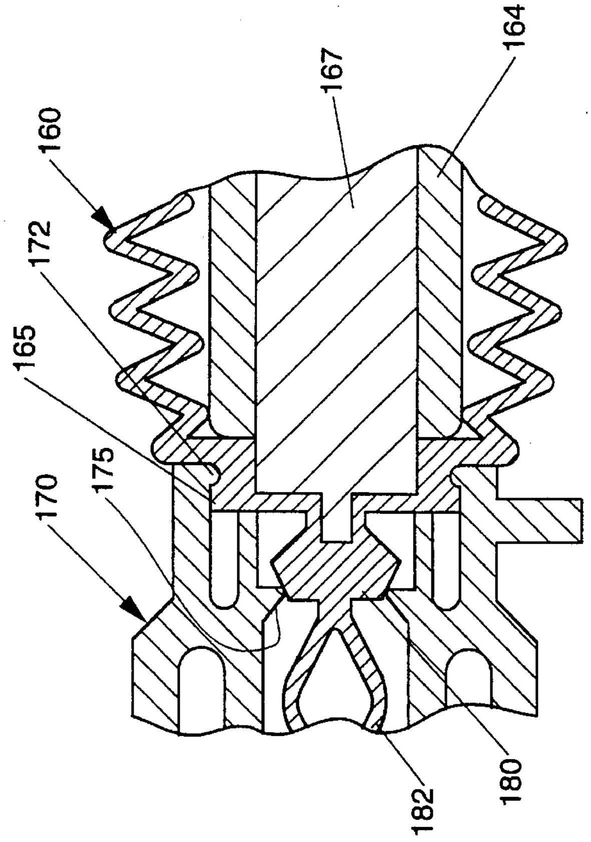
FIG. 13 is an enlarged fragmentary cross-sectional view similar to FIG. 12 but taken as the bellows an nozzle are being assembled.

Referring to FIGS. 12, 13 and 14, the process of severing the flexible legs 166 is accomplished utilizing a nozzle assembly tool 174 and a ended bellows assembly tool 163 including a housing 164 and a insertion pin 167. As with the previously illustrated process, the shoulder at the distal end of the housing 164 pushes the bellows 160 onto the nozzle 170 such that cooperating ribs 172 and 165 operate to attach the bellows 160 and nozzle 170 together (seen in FIG. 13). Referring to FIG. 14, the insertion pin 167 of the bellows assembly tool 163 then moves forward, engaging the recess of the outlet valve member 180. As the insertion pin 167 continues to move forward, the legs 166 are sheared by the insertion pin 167 working in conjunction with the distal end of the outlet valve seat 175 wall. As the legs 166 are sheared, the outlet valve member 180 is pushed past the outlet valve seat 175. The legs 166 of this embodiment include a weakened zone 169 in the form of a recess which forms a line of thinness across the flexible legs 166. Alternatively, the legs 166 may be sized so that they are sufficiently thin that severing is effected as described. Additionally, the outlet valve member 180 may be simply pushed past they outlet valve seat 175 by the insertion pin 167 until the legs 166 simply tear which eliminates the need for a separate cutting or shearing tool. It may also be desirable to cool the bellows 160 prior to insertion to make the bellows 160 more brittle; thereby aiding the shearing/tearing process.

Figure 10:
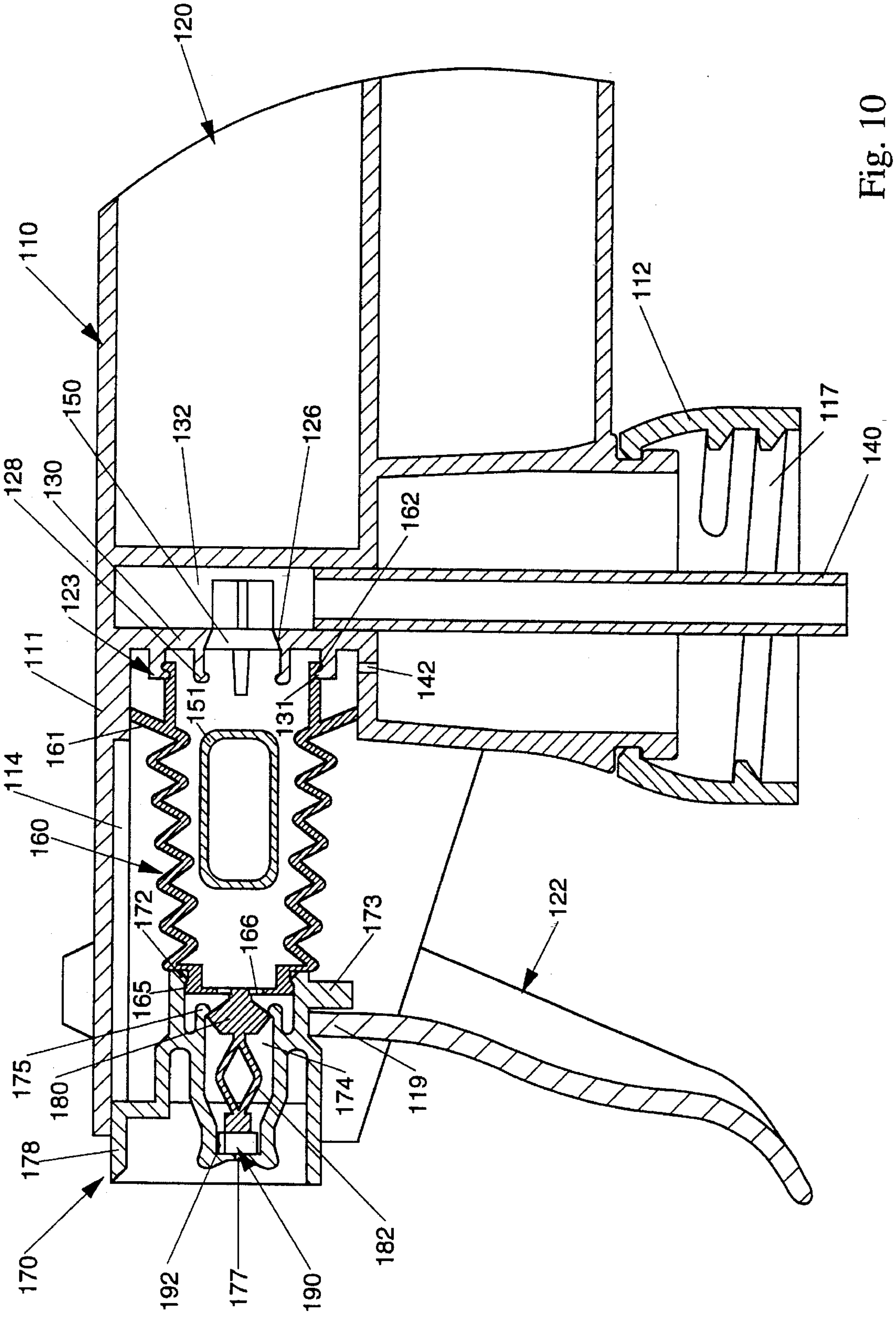
FIG. 10 is a cross-sectional view, similar to FIG. 2, of the assembled liquid dispensing pump device of FIG. 8.

To dispense liquid product from the source container (not seen), the trigger 122 is manually operated, as seen in FIG. 10, such that the tab 119 cooperates with depending wall 173; resulting in the nozzle 170 moving back toward the closure 112 in a linear direction. The nozzle 170 is guided in this direction by the cooperation between the lugs 178 and the channels 114. As the nozzle 170 moves back the bellows 160 is compressed which results in closing of the inlet valve 126 and 150 and opening of the outlet valve 175 and 180 allowing liquid to be sprayed through the swift chamber 190. The liquid flows into the swirl chamber 190 through swirl channels 191 which, in combination with the side wall, causes the fluid to spin as it exits the discharge orifice 177. Thus, liquid product is sprayed from the supply container (not seen).

Upon release of the trigger 122, the resiliency of the bellows 160 acts like a spring and expands, returning to its original shape. Alternatively, a spring (not seen) may be added to provide additional resiliency. The expansion of the bellows 160 creates a negative pressure therein. During this period of negative upstream pressure, the outlet valve 175 and 180 closes. Also during this period of negative downstream pressure, the inlet valve 126 and 150 opens; allowing product to flow into the bellows 160 for the next dispensing operation. Simultaneously, air may pass through the cup seal vent valve created by the annular flange 161 of the bellows 160 and the inner surface of the housing 110, if sufficient negative pressure is generated within the container (not seen). Thus, the container (not seen) is vented and the liquid dispensing pump device 120 is primed for the subsequent dispensing operation.

Although particular embodiments of the present invention have been illustrated and described, modifications may be made without departing from the teachings of the present invention. For example, the major axis of the collapsible pump chamber may be vertical and/or the liquid may be discharged in a simple liquid stream (as in with a lotion pump) wherein the nozzle is an open channel; or as a foam wherein air is mixed with the liquid (e.g., through use of a venturi) at or near a foam forming device (e.g., a screen or static mixer). Accordingly, the present invention comprises all embodiments within the scope of the appended claims.

What we claim is:

1. A process for assembling a manually operated dispensing device for pumping a liquid from a supply container and spraying the liquid through a discharge orifice, said process comprising the steps of:

(a) integrally molding a collapsible pump chamber having an outlet end and a retaining means, and having a volume within which is reduced in response to a manual compressive force, with a functional element of another function at the outlet end of the collapsible pump chamber;

(b) molding a nozzle with a retaining means for cooperating with the retaining means from the collapsible pump chamber to attach the nozzle and the collapsible pump chamber together;

(c) pressing and attaching together the collapsible pump chamber and the nozzle via the retaining means; and (d) severing the functional element of another function from the collapsible pump chamber.

2. A process for assembling a manually operated dispensing device according to claim 1 wherein the step of severing the functional element of another function from the collapsible pump chamber is accomplished by cutting with a sharp edge.

3. A process for assembling a manually operated dispensing device according to claim 1 wherein the step of severing the functional element of another function from the collapsible pump chamber is accomplished by shearing.

4. A process for assembling a manually operated dispensing device according to claim 1 wherein the step of severing the functional element of another function from the collapsible pump chamber is accomplished by tearing.

5. A process for assembling a manually operated dispensing device for pumping a liquid from a supply container and spraying the liquid through a discharge orifice, said process comprising the steps of:

(a) integrally molding a bellows having an outlet end and a retaining means, with an outlet valve member and an outlet valve biasing spring at the outlet end of the bellows;

(b) molding a nozzle with an outlet valve seat and a retaining means for cooperating with the retaining means from the bellows to attach the nozzle and the bellows together;

(c) pressing and attaching together the bellows and the nozzle via the retaining means; and (d) severing at least one of the outlet valve member and the outlet valve biasing spring from the bellows.

6. A process for assembling a manually operated dispensing device according to claim 5 further comprising the step of pushing said outlet valve member of the bellows past the outlet valve seat of the nozzle.

7. A process for assembling a manually operated dispensing device according to claim 5 further comprising the steps of: inserting the nozzle into a nozzle assembly tool; and inserting the bellows onto a bellows assembly tool; both of these steps being performed prior to the step (d) of severing and the step (c) of pressing.

8. A process for assembling a manually operated dispensing device according to claim 6 further comprising the steps of: inserting the nozzle into a nozzle assembly tool; and inserting the bellows onto a bellows assembly tool; both of these steps being performed prior to the step (d) of severing and the step (c) of pressing.

9. A process for assembling a manually operated dispensing device according to claim 5 wherein the step (d) of severing is accomplished by curing with a sharp edge.

10. A process for assembling a manually operated dispensing device according to claim 6 wherein the step (d) of severing is accomplished by cutting with a sharp edge.

11. A process for assembling a manually operated dispensing device according to claim 5 wherein the step (d) is accomplished by shearing.

12. A process for assembling a manually operated dispensing device according to claim 6 wherein the step (d) of severing is accomplished by shearing.

13. A process for assembling a manually operated dispensing device according to claim 5 wherein the step (d) of severing is accomplished by tearing.

14. A process for assembling a manually operated dispensing device according to claim 6 wherein the step (d) of severing is accomplished by tearing.

15. A process for assembling a manually operated dispensing device according to claim 8 wherein the step (d) of severing is accomplished by curing with a sharp edge.

16. A process for assembling a manually operated dispensing device according to claim 8 wherein the step (d) of severing is accomplished by shearing.

17. A process for assembling a manually operated dispensing device according to claim 8 wherein the step (d) of severing is accomplished by tearing.

18. A process for assembling a manually operated dispensing device according to claim 15 wherein the step (b) of molding the nozzle includes molding an abutting wall which abuts against the bellows at the point at which at least one of the outlet valve member and the outlet valve biasing spring is severed from the bellows and wherein the step (d) of severing at least one of the outer valve member and the outlet valve biasing spring is aided by the abutting wall.

19. A process for assembling a manually operated dispensing device according to claim 8 wherein the step (b) of molding the nozzle includes molding an abutting wall which abuts against the bellows at the point at which at least one of the outlet valve member and the outlet valve biasing spring is severed from the bellows and wherein the step (d) of severing at least one of the outlet valve member and the outlet valve biasing spring is aided by the abutting wall.

* * * * *

UNITED STATES PATENT AND TRADEMARK OFFICE

CERTIFICATE OF CORRECTION

PATENT NO. : 5,561,901

DATED : October 8, 1996

INVENTOR(S) : Robert E. Stahley and Robert J. Peterson

It is certified that error appears in the above-identified patent and that said Letters Patent is hereby corrected as shown below:

*Column 13, Claim 9, after "by" delete -- curing-- and insert therefor--cutting--*

*Column 14, Claim 15, after "by" delete -- curing -- and insert therefor -- cutting --.*

Signed and Sealed this

Twenty-ninth Day of December, 1998

*Attest:*

Bruce Lehman

BRUCE LEHMAN

*Attesting Officer*

*Commissioner of Patents and Trademarks*